United States Patent [19]
Boes

[11] Patent Number: 5,193,056
[45] Date of Patent: Mar. 9, 1993

[54] DATA PROCESSING SYSTEM FOR HUB AND SPOKE FINANCIAL SERVICES CONFIGURATION

[75] Inventor: R. Todd Boes, Boston, Mass.

[73] Assignee: Signature Financial Group Inc., Boston, Mass.

[21] Appl. No.: 667,777

[22] Filed: Mar. 11, 1991

[51] Int. Cl.$^5$ .................... G06F 15/21; G06F 15/30
[52] U.S. Cl. .................................................. 364/408
[58] Field of Search .............................. 364/401, 408

[56] References Cited

PUBLICATIONS

Boston Business Journal, Nov. 11, 1991, "Signature seeks patent for mutual fund wheel", p. 6 (abstract only).
BNA Securities Law Daily, Mar. 20, 1992, "Dingell asks Breeden for report on so-called 'hub-and-spoke' funds".
Financial Services Week, Apr. 20, 1992, "Hub-and-Spoke Funds Draw Regulators' Attention".
Barons, Feb. 17, 1992, Eaton, "Mutual Funds: Wheeling and Dealing", p. 39, column 3 (abstract only).
Business Wire (San Francisco, Calif.), Mar. 30, 1992, Becker "Signature Licenses Hub and Spoke System to Van Eck Associates", pp. s1, p1.
DataPro Directory of Software, Apr. 1991, McGraw-Hill Pub. Co., pp. D15-450-001 to D15-450-017.
The Wall Street Journal, Jul. 13, 1987, Sebastian, "More Groups Structure Funds as Partnerships", p. 25, column 3 (Eastern Edition).
Data Sources, Computer Associates International, Inc., 1989, pp. J-416 to J-426.

Primary Examiner—Roy N. Envall, Jr.
Assistant Examiner—David Huntley
Attorney, Agent, or Firm—Pennie & Edmonds

[57] ABSTRACT

A data processing system is provided for monitoring and recording the information flow and data, and making all calculations, necessary for maintaining a partnership portfolio and partner fund (Hub and Spoke) financial services configuration. In particular, the data processing system makes a daily allocation of assets of two or more funds (Spokes) that are invested in a portfolio (Hub). The data processing system determines the percentage share (allocation ratio) that each fund has in the portfolio, while taking into consideration daily changes both in the value of the portfolio's investment securities and in the amount of each fund's assets. The system also calculates each fund's total investments based on the concept of a book capital account, which enables determination of a true asset value of each fund and accurate calculation of allocation ratios between the funds. The data processing system also tracks all the relevant data, determined on a daily basis for the portfolio and each fund, so that aggregate year-end data can be determined for accounting and for tax purposes for the portfolio and for each fund.

6 Claims, 18 Drawing Sheets

| INSTITUTIONAL FUND | | |
|---|---|---|
| | $ AMOUNT | BASIS POINTS |
| | 150,000,000 | |
| EXPENSE TYPE | | |
| INVESTMENT ADVISORY FEE | 300,000 | 0.20% |
| ADMINISTRATIVE FEES | 150,000 | 0.10% |
| CUSTODY FEES | 55,000 | 0.04% |
| CUSTODY TRANSACTION FEES | 15,000 | 0.01% |
| PORTFOLIO ACCOUNTING | 45,000 | 0.03% |
| LEGAL | 23,000 | 0.02% |
| AUDIT | 35,000 | 0.02% |
| TRUSTEES FEES AND EXPENSES | 24,600 | 0.02% |
| PRINTING | 9,300 | 0.01% |
| SHAREHOLDER SERVICING FEES | 150,000 | 0.10% |
| 12b-1 EXPENSES | 20,500 | 0.01% |
| ORGANIZATION EXPENSES | 5,000 | 0.00% |
| MISCELLANEOUS | 30,000 | 0.02% |
| | 862,400 | 0.57% |

| RETAIL FUND | | |
|---|---|---|
| | $ AMOUNT | BASIS POINTS |
| | 100,000,000 | |
| EXPENSE TYPE | | |
| INVESTMENT ADVISORY FEE | 200,000 | 0.20% |
| ADMINISTRATIVE FEES | 150,000 | 0.15% |
| CUSTODY FEES | 55,000 | 0.06% |
| CUSTODY TRANSACTION FEES | 15,000 | 0.02% |
| PORTFOLIO ACCOUNTING | 45,000 | 0.05% |
| LEGAL | 23,000 | 0.02% |
| AUDIT | 35,000 | 0.04% |
| TRUSTEES FEES AND EXPENSES | 24,600 | 0.02% |
| PRINTING | 18,300 | 0.02% |
| SHAREHOLDER SERVICING FEES | 400,000 | 0.40% |
| 12b-1 EXPENSES | 38,500 | 0.04% |
| ORGANIZATION EXPENSES | 5,000 | 0.01% |
| MISCELLANEOUS | 20,000 | 0.02% |
| | 1,029,400 | 1.03% |

FIG.2

| PORTFOLIO (HUB) | | | |
|---|---|---|---|
| | | $ AMOUNT | BASIS POINTS |
| AVERAGE ASSETS | | 250,000,000 | |
| EXPENSE TYPE | | | |
| INVESTMENT ADVISORY FEE | | 500,000 | 0.20% |
| ADMINISTRATIVE FEES | | 125,000 | 0.05% |
| CUSTODY FEES | | 60,000 | 0.02% |
| CUSTODY TRANSACTION FEES | | 15,000 | 0.01% |
| PORTFOLIO ACCOUNTING | | 45,000 | 0.02% |
| LEGAL | | 18,000 | 0.01% |
| AUDIT | | 30,000 | 0.01% |
| TRUSTEES FEES AND EXPENSES | | 24,600 | 0.01% |
| MISCELLANEOUS | | 8,500 | 0.00% |
| TOTAL EXPENSES | | 826,100 | 0.33% |

(CONT. ON SECOND SHEET)

FIG.3

(CONT. FROM FIRST SHEET)

| INSTITUTIONAL FUND (SPOKE A) – 26 | | |
|---|---|---|
| EXPENSE TYPE | $ AMOUNT | BASIS POINTS |
| | 150,000,000 | |
| INVESTMENT ADVISORY FEE | | 0.00% |
| ADMINISTRATIVE FEES | 75,000 | 0.05% |
| CUSTODY FEES | | 0.00% |
| CUSTODY TRANSACTION FEES | | 0.00% |
| PORTFOLIO ACCOUNTING | | 0.00% |
| LEGAL | 5,000 | 0.00% |
| AUDIT | 10,000 | 0.01% |
| TRUSTEES FEES AND EXPENSES | 24,600 | 0.02% |
| PRINTING | 9,300 | 0.01% |
| SHAREHOLDER SERVICING FEES | 150,000 | 0.10% |
| 12b-1 EXPENSES | 28,500 | 0.01% |
| ORGANIZATION EXPENSES | 5,000 | 0.00% |
| MISCELLANEOUS | 30,000 | 0.02% |
| | 329,400 | 0.22% |
| ALLOCATION OF HUB EXPENSES | 495,660 | 0.33% |
| | 825,960 | 0.55% |

| RETAIL FUND (SPOKE B) – 28 | | |
|---|---|---|
| EXPENSE TYPE | $ AMOUNT | BASIS POINTS |
| | 100,000,000 | |
| INVESTMENT ADVISORY FEE | | 0.00% |
| ADMINISTRATIVE FEES | 100,000 | 0.10% |
| CUSTODY FEES | | 0.00% |
| CUSTODY TRANSACTION FEES | | 0.00% |
| PORTFOLIO ACCOUNTING | | 0.00% |
| LEGAL | 5,000 | 0.01% |
| AUDIT | 10,000 | 0.01% |
| TRUSTEES FEES AND EXPENSES | 24,600 | 0.02% |
| PRINTING | 18,300 | 0.02% |
| SHAREHOLDER SERVICING FEES | 400,000 | 0.40% |
| 12b-1 EXPENSES | 38,500 | 0.04% |
| ORGANIZATION EXPENSES | 5,000 | 0.01% |
| MISCELLANEOUS | 20,000 | 0.02% |
| | 621,400 | 0.62% |
| ALLOCATION OF HUB EXPENSES | 338,440 | 0.33% |
| | 951,840 | 0.95% |

FIG.3(Cont.)

DATA PROCESSING SYSTEM FOR HUB AND SPOKE FINANCIAL SERVICES CONFIGURATION

BACKGROUND OF THE INVENTION

Investment vehicles such as mutual funds have certain operating costs. To name just a few expenses, every fund, including institutional funds (whose investors are financial institutions), pays an investment advisory fee to an investment adviser who invests the fund's assets, custodian fees to a custodian for the safekeeping of the fund's assets, portfolio accounting fees for the determination of the fund's asset value and income, shareholder servicing fees to various entities which provide investors with information and services regarding the fund, an audit fee to the fund's independent accountants who review the fund's financial statements, and a legal fee for counsel to represent the fund and each of its independent trustees. A retail fund (one whose investors are largely individuals) incurs the same kinds of expenses as an institutional fund, although certain expenses, such as shareholder servicing fees and distribution (12b-1) fees, will be larger for a retail fund, since individual investors need more services than do sophisticated institutional investors.

Having a large amount of assets results in various economies of scale in fund operating costs. Since many of a fund's expenses are independent of the fund's asset base, a larger fund asset base produces a lower operating expense ratio (expenses to assets), which increases the net investment performance of the fund. Also, since larger funds purchase securities in larger denominations, they are able to bargain for higher yields (on bonds and other debt securities) or pay lower brokerage commissions (on equity securities) than a smaller fund can.

One way to achieve a large asset base is to combine assets of two or more mutual funds or other collective investment vehicles (hereafter referred to as funds). Current laws, however, place several restrictions on commingling the assets. A newly developed financial services configuration, called "Hub and Spoke" (a service mark of Signature Financial Group, Inc.), does allow for commingling the assets of two or more mutual funds. This financial services configuration involves an entity that is treated as a partnership for federal income tax purposes and that holds the investment portfolio (hereafter referred to as the partnership portfolio) and funds that invest as partners in the partnership portfolio.

Under the partnership portfolio and partner fund configuration, each of several funds, called "Spokes" (a service mark of Signature Financial Group, Inc.), can be a mutual fund registered under the Investment Company Act of 1940 (the "1940 Act") and the Securities Act of 1933 (the "1933 Act"). In addition to mutual funds, a "Spoke" (a service mark of Signature Financial Group, Inc.) may also be a pension fund (subject to ERISA), a common trust fund (regulated by various banking regulators), an insurance company separate account, or a non-U.S. domiciled investment fund In addition, a partnership portfolio, called the "Hub" (a service mark of Signature Financial Group, Inc.), is established, and each fund is an investor in the partnership portfolio. The partnership portfolio is registered under the 1940 Act (since it is an investment company), but its shares are not registered under the 1933 Act. Individuals cannot invest directly in the partnership portfolio. Its only investors are the funds, each of which invests 100% of its assets in the portfolio.

Although the portfolio may legally be a trust or other entity, it is considered to be a partnership for tax purposes. As a partnership, it receives "flow-through" tax treatment and, so, the portfolio does not pay taxes, but rather all economic gain or loss flows through to the portfolio investors. Mutual funds must rely on qualifying for "regulated investment company" ("RIC") status under the Internal Revenue Code (the "Code") to avoid taxation. The RIC provisions of the Code generally prevent mutual funds from investing in other types of funds and impede the division of a single mutual fund into multiple mutual funds. These RIC provisions also lead to economic distortions and inequities among shareholders which will be discussed below.

With the assets of two or more funds combined in the portfolio, the economies of scale described above can be more fully realized. The assets of different types of investment vehicles may now be commingled, resulting in more efficient and effective investment management. While all funds can benefit from Hub and Spoke services, a fund with a small amount of assets, which ordinarily would not be a viable fund because it would have a prohibitively high operating expense ratio, can now be established on a cost-effective basis by investing its assets in a portfolio. Investing in a portfolio also provides the new fund with an investment history, which makes the fund more attractive to investors. Therefore, a mutual fund sponsor can more efficiently organize a new mutual fund to be offered to customer markets which previously could not be economically accessed by that sponsor.

Because the portfolio is not a mutual fund, it is not subject to certain economic distortions and inequities that are inherent to normal mutual fund investing. Consider a first fund which invests in a second mutual fund just before the second fund distributes its capital gains. The first fund realizes capital gains from this distribution, as does every shareholder of the second fund. The first fund, however, has not actually realized any gain in the value of the second fund, and so the second fund is merely returning a portion of the first fund's original investment. The first fund is required to pay tax on part of its original investment or, if it is a mutual fund, pass such tax on to its shareholders. Thus a return of investment becomes subject to tax.

Unlike a mutual fund, the portfolio makes daily allocations of income, capital gains, and expenses or investment losses, rather than actual distributions. These daily allocations, which are determined and managed by the data processing system and method disclosed herein, are based on an "allocation ratio" which is further described below. Such daily allocations avoid economic distortions and inequities by directly allocating the appropriate economic benefit and loss to each shareholder on that day. Mutual funds merely distribute income, and gain or loss, to whatever shareholders happen to exist on an arbitrary date when a distribution is made. While such gain or loss is taken into account in between such distributions through the determination of the net asset value of the mutual fund's shares, it is the distribution of the gain or loss which creates a taxable gain or loss for a shareholder. The Hub and Spoke financial services configuration thus avoids this disadvantage by more accurately matching economic and taxable income.

The partnership portfolio and partner fund configuration presents great administrative challenges. Because each of the partners in the portfolio is some type of fund, the assets of which change daily as customers make further investments or withdrawals, the partnership interest of each fund varies daily. For example, consider a portfolio made up of Funds A and B. Assume that at the start of the day Fund A has $750,000 invested in the portfolio and Fund B has $250,000 invested. The portfolio has $1,000,000 in assets with Fund A having a 75% share and Fund B having a 25% share. Next, assume that by the end of the day the portfolio has not changed in value due to market fluctuations, but that additional purchases by fund shareholders have given Fund A $800,000 in assets and Fund B $275,000 in assets. The portfolio has grown to $1,075,000 in assets, with Fund A having a 74.4% share and Fund B having a 25.6% share.

Further complexities arise as the value of the portfolio assets rise and fall or as additional funds invest in the portfolio (or as existing funds withdraw their investments entirely). Additionally, as in any mutual fund complex, many Hub and Spoke structures may be administered simultaneously. A new and unique data processing system and method is necessary to enable accurate daily allocations to be made among each of the funds in a portfolio. Also, each such daily allocation is comprised of various economic components—income, gain, loss, expenses. These various components must be isolated and aggregated, on a continual basis, for both non-tax accounting purposes and, again (in separate accounts), for tax purposes.

Economic inaccuracies would appear over time if daily allocations were not made. Such inaccuracies will arise since typically a mutual fund will not actually allocate or pay out on a daily basis the economic components of the fund's economic experience for that day. Depending on a particular fund's prospectus, actual cash distributions can be made monthly, quarterly, or as otherwise so determined.

Were the partnership portfolio structured as a mutual fund, which makes distributions on a periodic basis, income earned on a given day, if not allocated on that day would result in an increase in capital value of the fund as a whole, rather than in income received by a particular investor; similarly, expenses incurred, if not allocated on that day, would result in a decrease in capital value of the fund as a whole, rather than as a decrease in income for a particular investor. The data processing system and method of the present invention will allow each fund to recognize on its balance sheet its fair share of economic benefit or loss experienced by the portfolio on that day.

A unique method has been developed to calculate accurately the fund allocation ratios. Each fund has a book capital account, which represents each fund's total investment in the portfolio including all earned, but undistributed, economic benefit. This book capital account for each fund includes the previous day's fund shareholder purchases and redemptions, the fund's proportional share of daily portfolio income and expenses, and the fund's share of daily portfolio realized and unrealized gain or loss.

On each fund's first day as a portfolio investor, or on the beginning of each fiscal year that a fund continues to participate in a Hub and Spoke configuration, its respective share ownership in the portfolio is determined by its relative percentage of the total dollar amount of investments in the portfolio. Thereafter, the fund's allocation percentage is adjusted through proper adjustments to the book capital account balances of the participating funds (which a data processing system according to the present invention determines daily). The respective fund book capital accounts, which change every day, continually indicate the accurate relative ownership of the portfolio by each fund. Each fund's book capital account will be either increased or decreased daily depending upon the following:

(a) increased by any capital contributions (purchases by fund shareholders) made by the fund to the portfolio;

(b) decreased by any distributions (including portfolio expenses and redemptions by fund shareholders) made to the fund by the portfolio;

(c) increased by any increase in net unrealized gains or decrease in net unrealized losses allocated to the fund;

(d) decreased by any decrease in net unrealized gains or increase in net unrealized losses allocated to the fund; and (e) increased or decreased by the amount of profit (portfolio income) or loss (portfolio expenses), respectively, allocated to the fund.

A data processing system and method according to the present invention successfully determines each of these ever changing, and interrelated, accounts. By calculating the daily adjusted total investments for each fund according to the concept of a book capital account, the allocation ratios may be calculated accurately. The data processing system also determines, each day and over time, data necessary for calculating aggregate year-end income, expenses, and capital gain or loss for tax and accounting purposes.

SUMMARY OF THE INVENTION

The present invention provides a data processing system and method for monitoring and recording the information flow and data, and making all calculations, necessary for maintaining a partnership portfolio and partner fund (Hub and Spoke) financial services configuration. In particular, the data processing system provides means for a daily allocation of assets of two or more funds (Spokes) that are invested in a portfolio (Hub). The data processing system determines the percentage share (allocation ratio) that each fund has in the portfolio, while taking into consideration daily changes both in the value of the portfolio's investment securities (as determined by market prices) and in the amount of each fund's assets (as determined by daily shareholder purchases and redemptions). The system also allocates to each fund the portfolio's daily income, expenses, and net realized and unrealized gain or loss, calculating each fund's total investments based on the concept of a book capital account, thus enabling determination of a true asset value of each fund and accurate calculation of allocation ratios between the funds. The data processing system also tracks all the relevant data, determined on a daily basis for the portfolio and each fund, so that aggregate year-end income, expenses, and capital gain or loss can be determined for accounting and for tax purposes for the portfolio and for each fund.

BRIEF DESCRIPTION OF THE DRAWINGS

FIG. 2 is an example of the operating expenses in maintaining a traditional two-fund configuration.

FIG. 3 is an example of the operating expenses in maintaining the two funds of FIG. 2 in a Hub and Spoke configuration.

DETAILED DESCRIPTION OF THE PREFERRED EMBODIMENT

Figure 1:
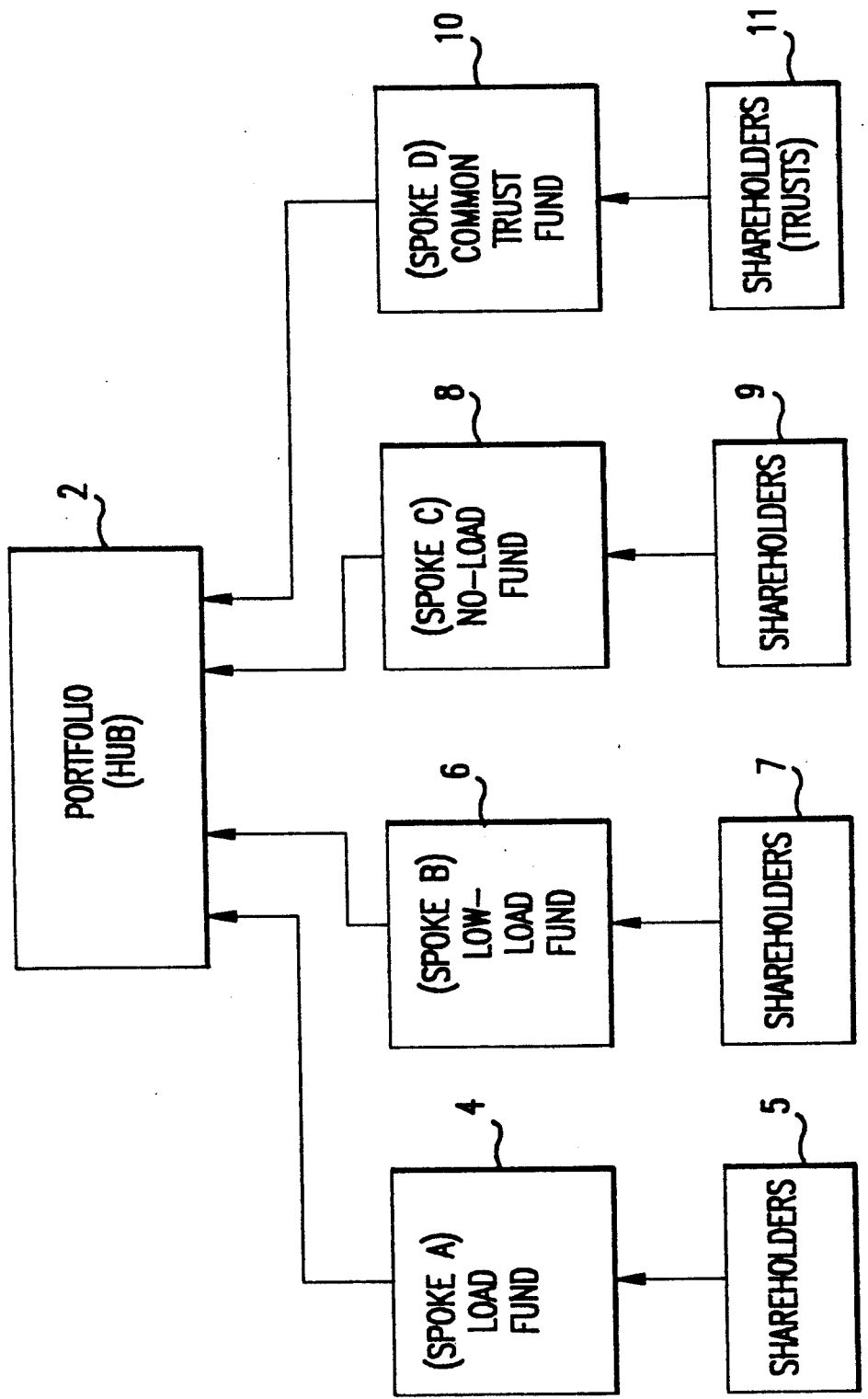
FIG. 1 is a block diagram representation of a partnership portfolio and partner fund (Hub and Spoke) financial services configuration.

The present invention is directed to a data processing system and method for use in managing a partnership portfolio and partner fund (Hub and Spoke) financial services configuration. Such a data processing system is used once the Hub and Spoke configuration has been established, in which the assets of two or more funds are invested in a portfolio. FIG. 1 depicts an example of a Hub and Spoke configuration involving four different mutual funds. A portfolio (Hub) 2, which is set up as a partnership as described above, has as its partners and only investors funds (Spokes) 4, 6, 8, and 10. In the example shown, fund 4 is a load fund, fund 6 is a low-load fund, fund 8 is a no-load fund, and fund 10 is a common trust fund. Each of funds 4, 6, 8, and 10 have shareholders 5, 7, 9, and 11, respectively, with fund 10 having trusts as its shareholders 11.

One advantage of the Hub and Spoke configuration structure may be seen by comparing the example of a traditional two-fund configuration depicted in FIG. 2 with the two-fund Hub and Spoke configuration of FIG. 3.

FIG. 2 presents the expense profiles for institutional fund 20, with assets of $150 million, and retail fund 22, with assets of $100 million, when maintained in a traditional structure. Each has the following expenses: investment advisory fees, administrative fees, custody fees, custody transaction fees, portfolio accounting fees, legal fees, audit fees, trustees fees and expenses, shareholder servicing fees, 12b-1 expenses, organization expenses, and miscellaneous fees. The total cost is 57 basis points for institutional fund 20 and 103 basis points for retail fund 22.

An example of the same two funds in a Hub and Spoke structure is depicted in FIG. 3, which shows the expense profiles of the portfolio and each fund. Specifically, portfolio (Hub) 24 has the following expenses: investment advisory fees, administrative fees, custody fees, custody transaction fees, portfolio accounting fees, legal fees, audit fees, trustees fees and expenses, and miscellaneous fees. The investors in portfolio 24 are an institutional fund (Spoke A) 26 and a retail fund (Spoke B) 28. As with funds 20 and 22 in FIG. 2, institutional fund 26 has assets of $150 million and retail fund 28 has $100 million in assets.

Funds 26 and 28 pay the expenses of portfolio 24 in proportion to the percentage share (as determined by the book capital accounts) each holds in the portfolio, as shown on the line item "ALLOCATION OF HUB EXPENSES" for funds 26 and 28. In addition, each fund has the following expenses of its own: administrative fees, legal fees, audit fees, trustees fees and expenses, printing fees, shareholder servicing fees, 12b-1 expenses, organization expenses, and miscellaneous fees.

As FIG. 3 shows, in the Hub and Spoke financial services configuration such expenses as investment advisory fees, custody fees, custody transaction fees, and portfolio accounting fees are paid only at the Hub level (i.e., by the portfolio). Thus, expenses are lower under the Hub and Spoke configuration: institutional fund 26 shows total expenses of 55 basis points as compared with the 57 basis points for traditionally structured institutional fund 20, and retail fund 28 shows expenses of 95 basis points as compared with the 103 basis points for traditionally structured institutional fund 22.

Figure 4:
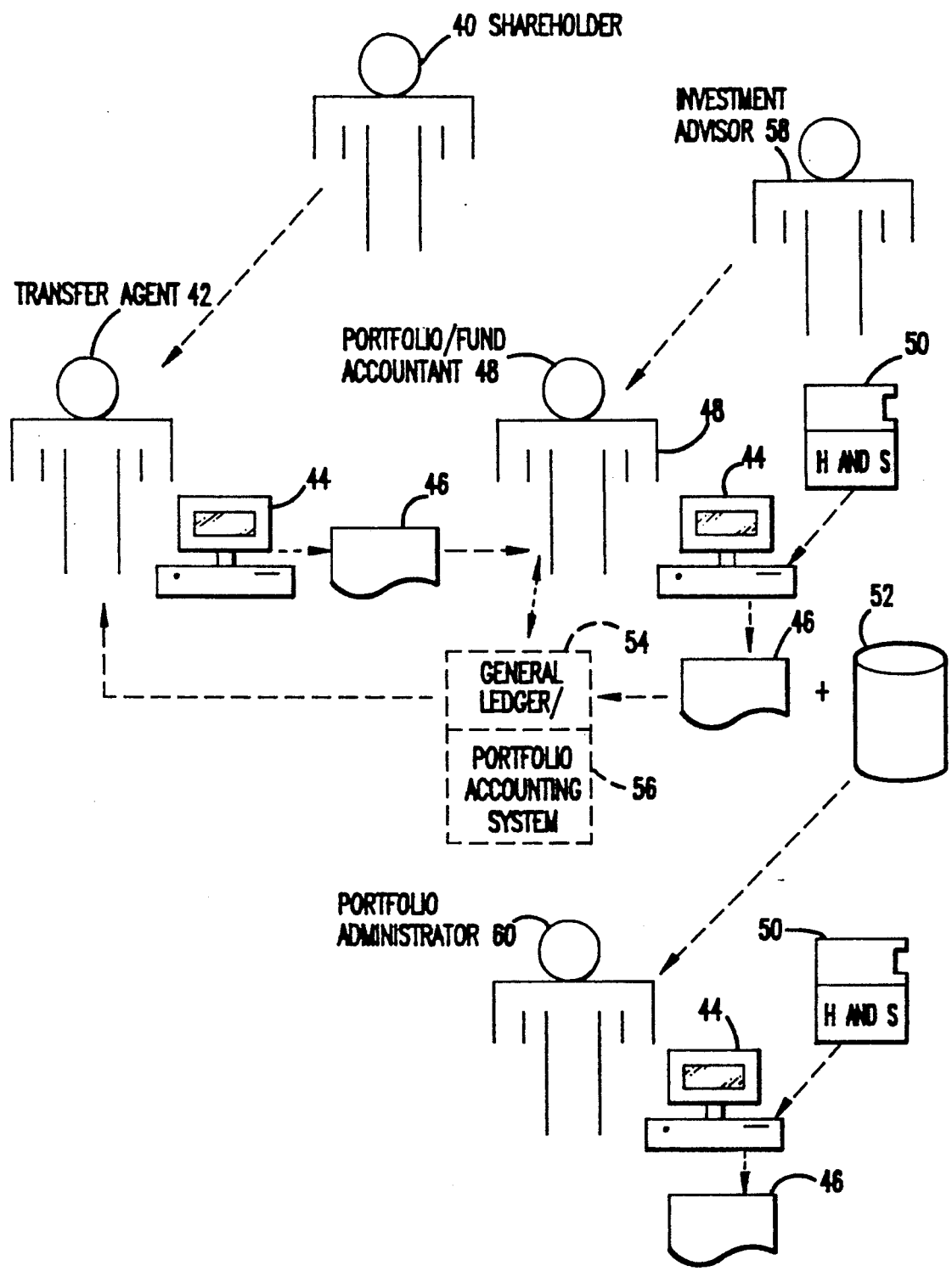
FIG. 4 depicts an overview of the flow of information in the management of a Hub and Spoke configuration using a data processing system according to the present invention.

FIG. 4 presents an overview of the information flow that occurs in the management of a Hub and Spoke financial services configuration. A shareholder 40 requests purchases or redemptions of shares in a fund from a transfer agent 42. Transfer agent 42 is responsible for tracking the shareholder activity for each fund, which is accomplished with the aid of a personal computer 44 capable of producing printed output 46. Information on shareholder purchases and redemptions for each fund is passed to a portfolio/fund accountant 48.

Portfolio/fund accountant 48 is responsible for the portion of managing the Hub and Spoke configuration that involves allocation of portfolio assets among each of its funds, taking into account market value fluctuations in the portfolio's investments of its assets as well as shareholder purchases and redemptions in each fund. The portfolio/fund accountant makes use of a personal computer 44 programmed with software 50. One example of software 50 is the "HandS" (a service mark of Signature Financial Group, Inc.) computer program. The personal computer 44 used by portfolio/fund accountant 48 is capable of producing printed output 46 and storing data on data disk 52, which preferably is a floppy disk, although other types of storage media may be used. Portfolio/fund accountant 48 receives information from and provides information to a general ledger 54 and a portfolio accounting system 56, both of which are computer programs of a type commonly used in accounting and which may be combined in a single software application. An integrated software package may combine software 50 with either or both of general ledger 54 and portfolio accounting system 56. Information from printed output 46 may be entered into general ledger 54 and portfolio accounting system 56 and then passed along to transfer agent 42. Portfolio/fund accountant 48 also provides information to and receives information from an investment advisor 58, who is responsible for investment decisions regarding the portfolio's assets.

Information on data disk 52 is transferred to a portfolio administrator 60. The Hub and Spoke management responsibilities of portfolio administrator 60 include issuing and maintaining software 50, periodically reviewing for errors in data submitted by portfolio/fund accountant 48, and calculating and processing data to obtain the year-end data for the portfolio and funds for tax and accounting purposes. Portfolio administrator 60 uses personal computer 44 running software 50 and capable of producing printed output 46. Typically, portfolio administrator 60 manages several separate Hub and Spoke configurations.

The information flow depicted in FIG. 4 may be accomplished in whole or in part by physical transfer of printed or computer-readable media, or over communication lines.

Figure 5:
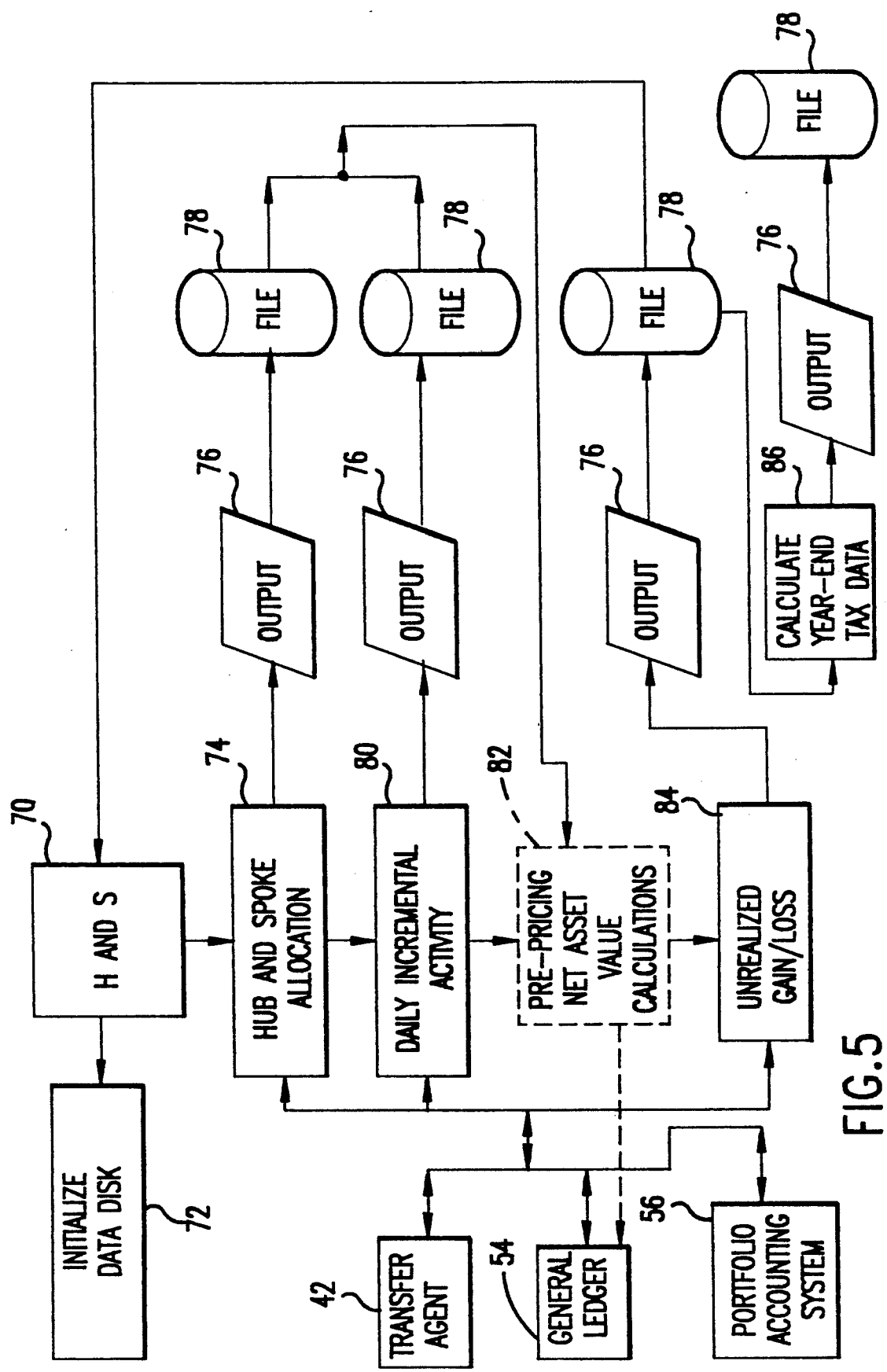
FIG. 5 depicts the flow of information through modules of software used in a data processing system according to the present invention.

FIG. 5 depicts the information flow through modules of software 50, with the starting point of software 50 represented by block 70. When necessary, a user, typically portfolio administrator 60, initializes data disk 52, as shown in block 72. Specifically, data disk 52 is initialized the first day a Hub and Spoke configuration is administered, when a new Spoke is added to the Hub, when an existing Spoke is dropped from the Hub, or when a new fiscal year for a Hub and Spoke structure begins.

On a daily basis (i.e., once for every business day), a user, typically portfolio/fund accountant 48, proceeds from the starting point at block 70 to the following software modules: Hub and Spoke allocation, at block 74; daily incremental activity, at block 80, and unrealized gain/loss, at block 84. At each of those modules, data may be output, as shown at blocks 76, or stored in a file on data disk 52, as shown at blocks 78. The modules at blocks 74, 80, and 84 may send information to and receive information from transfer agent 42, general ledger 54, and portfolio accounting system 56. Following execution of the unrealized gain/loss module, at block 84, software 50 returns to the starting point, at block 70, so that execution of the modules at blocks 74, 80, 82, and 84 may be repeated for the next day.

In addition, following completion of the daily incremental activity module (block 80), data developed in that module and from the Hub and Spoke allocation module (block 74) is automatically passed to a pre-pricing net asset value calculations module, at block 82, and the data developed in that module may be passed to general ledger 54. Once a year, a user, typically fund administrator 60, will have software 50 proceed to a calculate year-end tax data module, shown at block 86. Again, the system can produce output, at block 76, and store data, at block 78.

Figure 6:
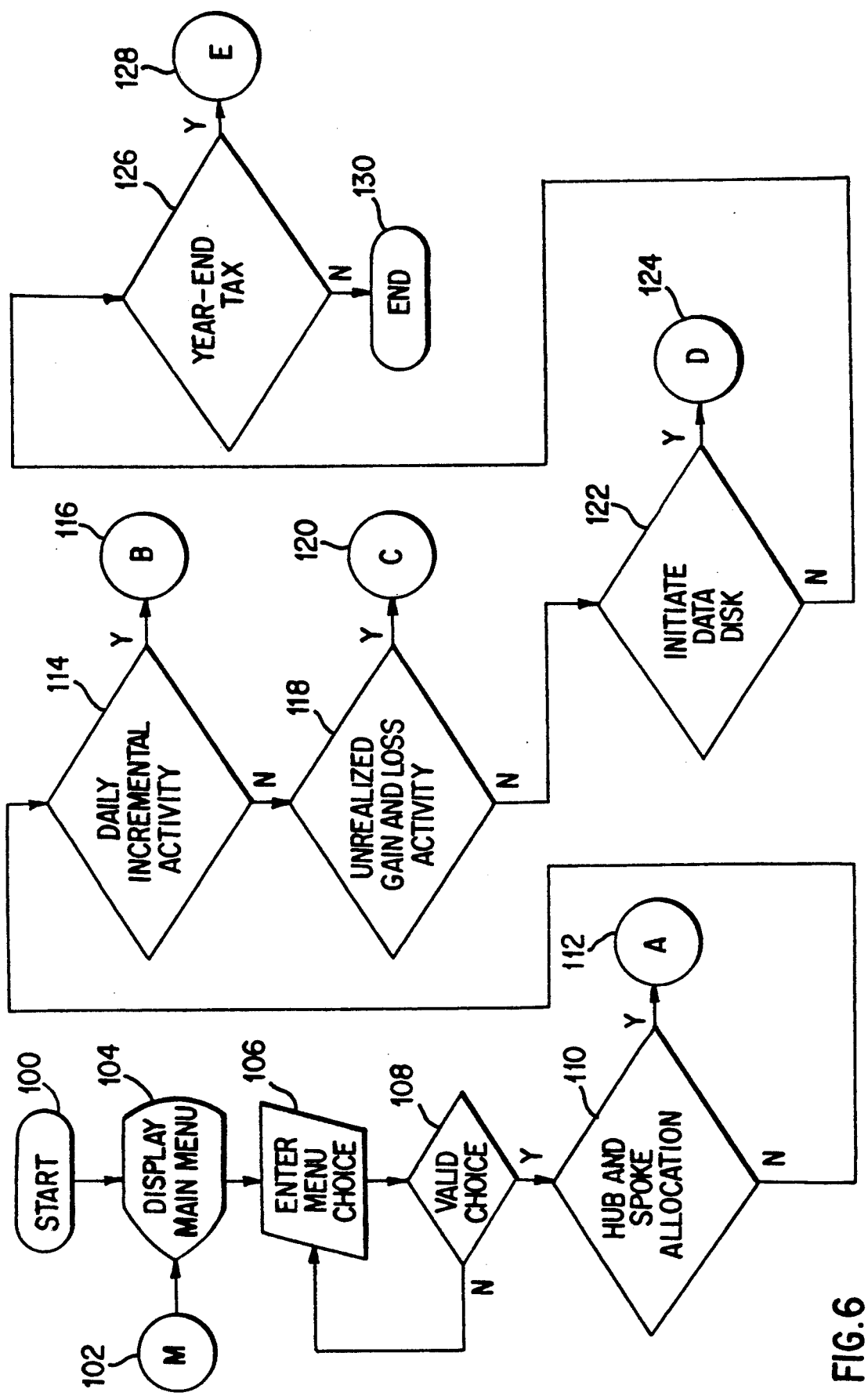
FIG. 6 is a flowchart of a software routine for a main menu used in a data processing system according to the present invention.

FIG. 6 is a flowchart depicting a main menu routine for software 50 to be used in a data processing system according to the preferred embodiment of the present invention. The system starts at block 100 and proceeds to block 104, where a main menu is displayed, for example, on the CRT of a personal computer. Entry point M as shown in block 102 is provided to allow other routines to return to the main menu routine.

The system next proceeds to block 106, where the user enters a one-letter menu choice. At block 108, the system determines whether a valid menu choice was entered. If not, the system returns to block 106 for the user to enter a menu choice; if so, the system proceeds to block 110. There, the system determines whether a Hub and Spoke allocation, routine was selected by the user from the main menu. If so, the system proceeds to that routine via entry point A, shown in block 112; if not, the system proceeds to block 114. At block 114, the system determines whether a daily incremental activity routine was selected by the user. If so, the system proceeds to that routine via entry point B, shown in block 116; if not, the system proceeds to block 118. Here, the system determines whether an unrealized gain or loss activity routine was selected by the user. If so, the system proceeds to that routine via entry point C, shown in block 120; if not, the system proceeds to block 122. At that block, the system determines whether an initiate data disk routine was selected. If so, the system proceeds to that routine via entry point D, shown in block 124; if not, the system proceeds to block 126. At block 126, the system determines whether a year-end tax routine was selected. If so, the system proceeds to that routine via entry point E, shown in block 128; if not, then the user selected the choice to exit from the main menu, and the system ends operation, as shown in block 130.

Figure 7:
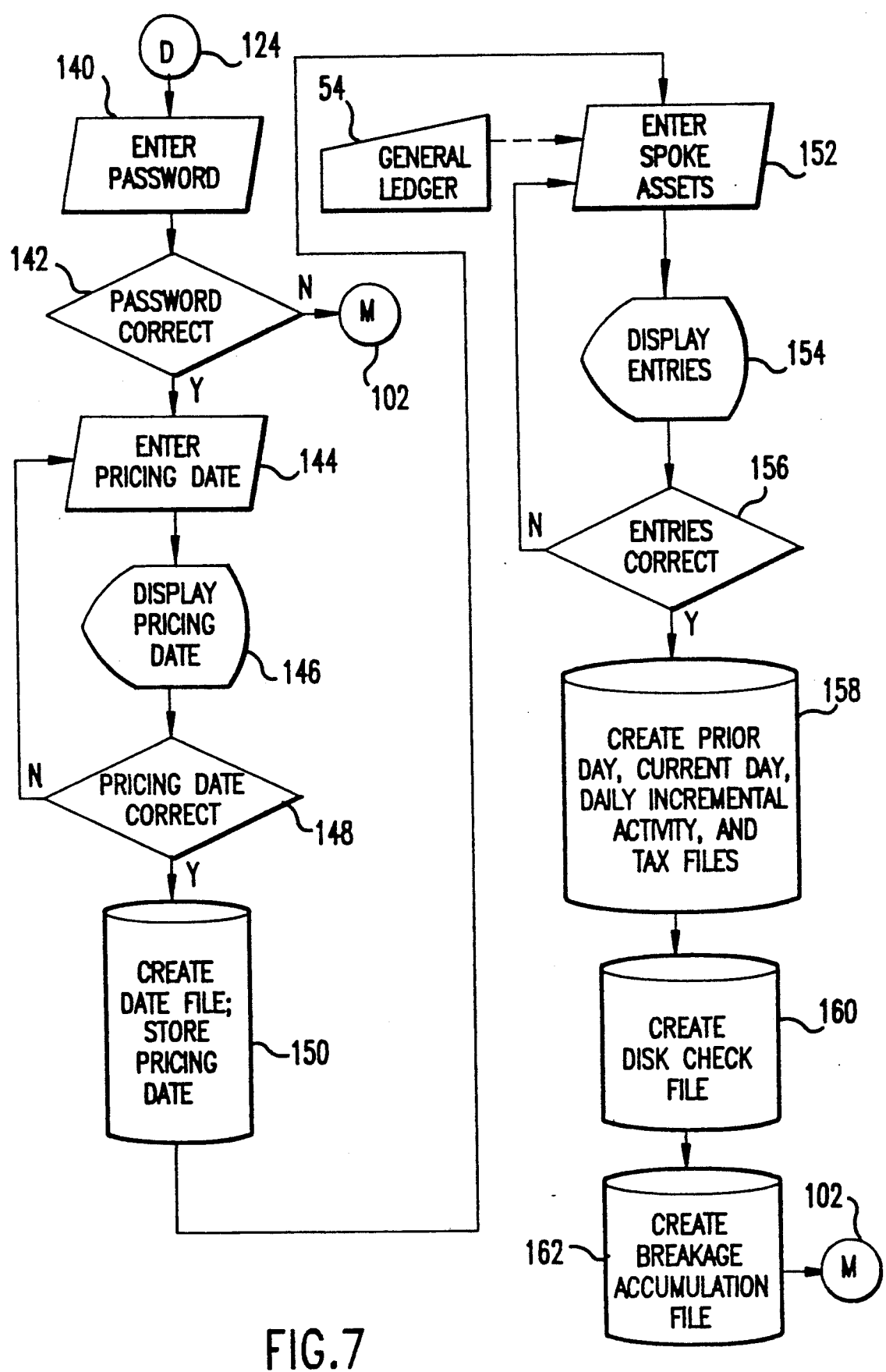
FIG. 7 is a flowchart of a software routine for initializing a data disk used in a data processing system according to the present invention.

FIG. 7 depicts a flowchart for an initialize data disk routine. The purpose of this routine, which implements the module at block 72 of FIG. 5, is to initialize data disk 52. Block 124 shows that the system proceeds via entry point D to block 140, where the user is asked to enter a password. As shown at block 142, the system then determines whether the entered password is correct, preferably by comparing the password entered by the user to a password in the code of software 50 as sent to portfolio/fund accountant 48 by portfolio administrator 60. If the password entered is not correct, the system returns to the main menu routine via entry point M as shown in block 102; if the password entered is correct, the system proceeds to block 144, the next step in the initialize data disk routine.

As shown in block 144, the system asks the user to enter the pricing date. The pricing date is the date to which all data entered into the system applies. The system then displays the pricing date entered, as shown in block 146, and then, at block 148, asks the user whether the displayed pricing date is correct. If the user indicates that the displayed pricing date is not correct, the system returns to block 144 to allow the user to enter the pricing date again; if the user indicates that the displayed pricing date is correct, then the system proceeds to the next step.

The system continues by creating a date file on data disk 52 and storing the pricing date to the date file, as block 150 shows. The system then proceeds to block 152, prompting the user to enter the Spoke assets for each fund that will invest in the portfolio (Hub). Data regarding the Spoke assets is typically provided from general ledger 54, and may be entered into the system manually by the user or automatically via an interface between the system and the general ledger that will be apparent to those of skill in the art. General ledger 54 may also be integrated with the system as part of software 50.

Next, at block 154, the system displays the entries for the Spoke assets, and then prompts the user to indicate whether the entries are correct, as block 156 shows. If the user indicates that the entries are not correct, the system returns to block 152 to allow the user to enter the Spoke assets data again; if the entries are correct, the system proceeds to block 158. As shown there, the system creates our files on the data disk: (1) a prior day file, which stores data for the prior day's total investments for the portfolio and each fund; (2) a current day file, which stores data for the adjusted total investments for the Hub and each Spoke and the allocation ratios (percentage each of the Spokes holds in the Hub, as determined by the book capital accounts); (3) a daily incremental activity file, which stores data for the income, expenses, and net realized gain or loss for the Hub; and (4) a tax file, which stores all daily activity data for computing aggregate year-end income expenses, and capital gain or loss for the Hub and each Spoke. The data stored for each day in the tax file includes the adjusted total investments for the Hub and Spokes; the daily incremental income, expenses, and net realized gain or loss for the Hub; the daily net unrealized gain or loss for the Hub and the Spokes; and the allocation ratios for each Spoke.

The system next goes to block 160, where a disk check file is created on the data disk and a disk check value that identifies the Hub and its Spokes is stored. The disk check value is preferably a part of the code of software 50 provided by fund administrator 60 and, as further described below, serves to prevent a user from using the wrong data disk for a particular Hub and Spoke configuration. The system next proceeds to block 162; there a breakage accumulator file is created on the data disk for storing data regarding fractional discrepancies that may arise during operation of the system. The system then returns to the main menu routine via entry point M, as shown at block 102.

Figure 8:
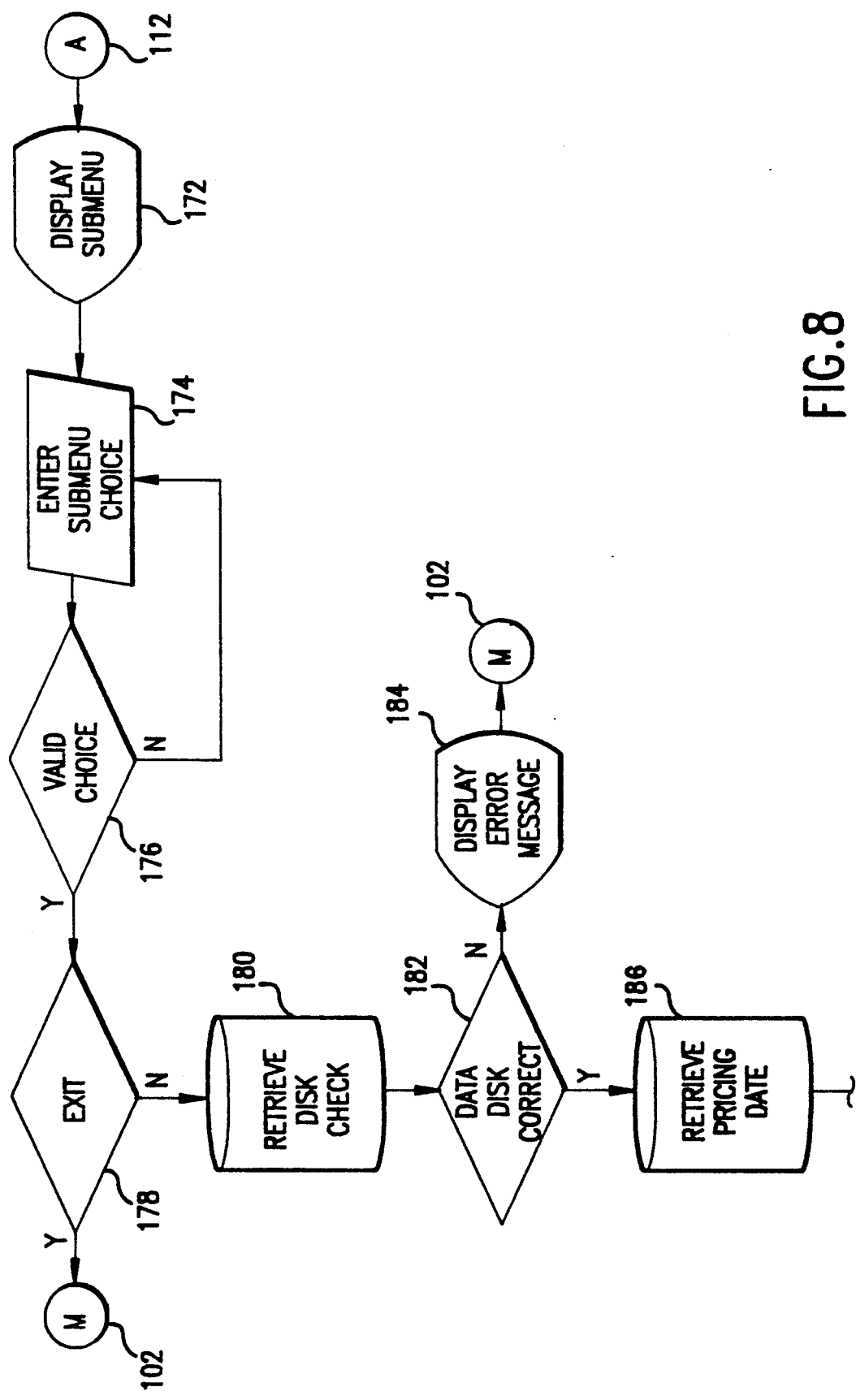
FIG. 8 is a flowchart of a software routine for daily allocation of assets between a portfolio and its funds used in a data processing system according to the present invention.
Figure 8:
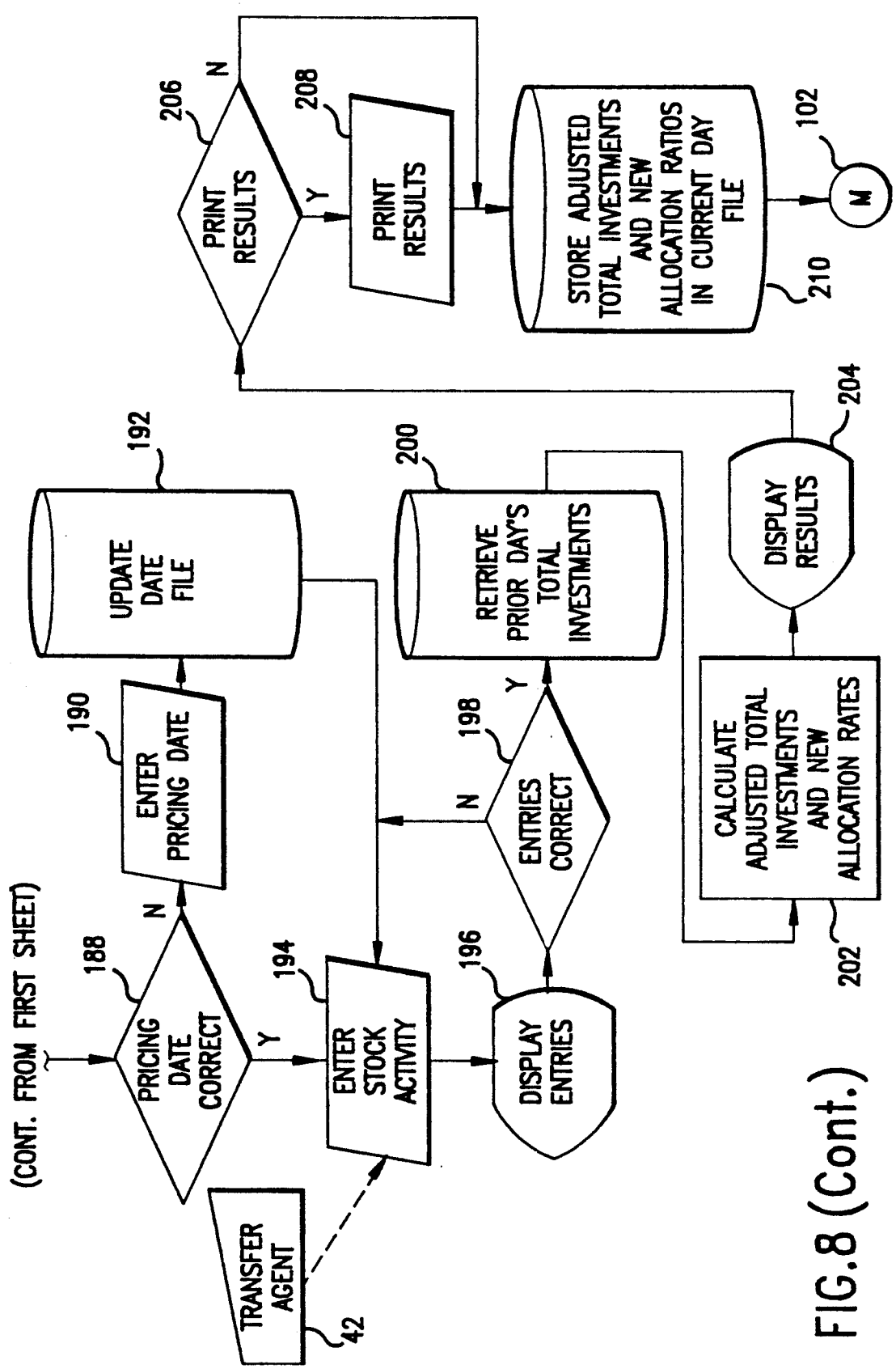

FIG. 8 is a flowchart for a Hub and Spoke allocation routine. The purpose of this routine, which implements the module at block 74 of FIG. 5, is to calculate the daily allocation ratios for the Spokes (i.e., the percentage share that each fund has in the portfolio), taking into consideration the previous day's purchases and redemptions in each fund. Starting at entry point A, shown in block 112, the system proceeds to block 172, where a submenu is displayed. The system next proceeds to block 174, where the user enters a one-letter submenu choice. At block 176, the system determines whether a valid submenu choice was entered. If not, the system returns to block 174 for the user to enter a submenu choice; if so, the system proceeds to block 178. There the system determines whether the user selected the submenu choice to exit. If so, the system returns to the main menu routine via entry point M, as shown in block 102; if not the system proceeds to the next step.

At block 180, the system retrieves the disk check value from the disk check file. At block 182, the system determines whether the data disk is correct—i.e., whether the proper data disk 52 is being used for one particular Hub and Spoke configuration as opposed to another Hub and Spoke configuration that may be administered by a portfolio/fund accountant 48. This is preferably done by comparing the check disk value retrieved from the check disk file with a check disk value in the code of software 50. If the two values do not match, the data disk is not correct, and the system proceeds to block 184, where an error message is displayed, and then returns to the main menu routine via entry point M, at block 102. If the two values do match, the data disk is correct, and the system proceeds to block 186.

At block 186, the system retrieves the pricing date from the date file. Next, the system goes to block 188, where the system queries the user to determine whether the pricing date is correct. If so, the system proceeds to block 194; if not, the system goes to block 190 to allow the user to enter the pricing date, then to block 192, in order to update the date file, and then to block 194.

As shown at block 194, the system allows the user to enter the stock activity (purchases and redemptions) that each Spoke experienced the previous day. This information is received from transfer agent 42, and may be entered manually or by means of a computer in a way that will be apparent to those of skill in the art. The system next displays the entries, at block 196, and asks the user whether the entries are correct. If not, the system returns to block 194; if so, the system proceeds to block 200.

At block 200, the system retrieves the prior day's total investments from the prior day file. At block 202, the system uses the prior day total investments and the stock activity entries to calculate the adjusted total investments and the new allocation ratios for the Spokes based on the book capital account for each fund. The results are displayed at block 204, and the system asks the user, at block 206, whether to print the results. If so, the results are printed at block 208 and the system proceeds to block 210; if not, the system proceeds directly to block 210. There, the system stores the adjusted total investments and the new allocation ratios in the current day file. The system then returns to the main menu routine via entry point M, as shown at block 102.

Figure 9A:
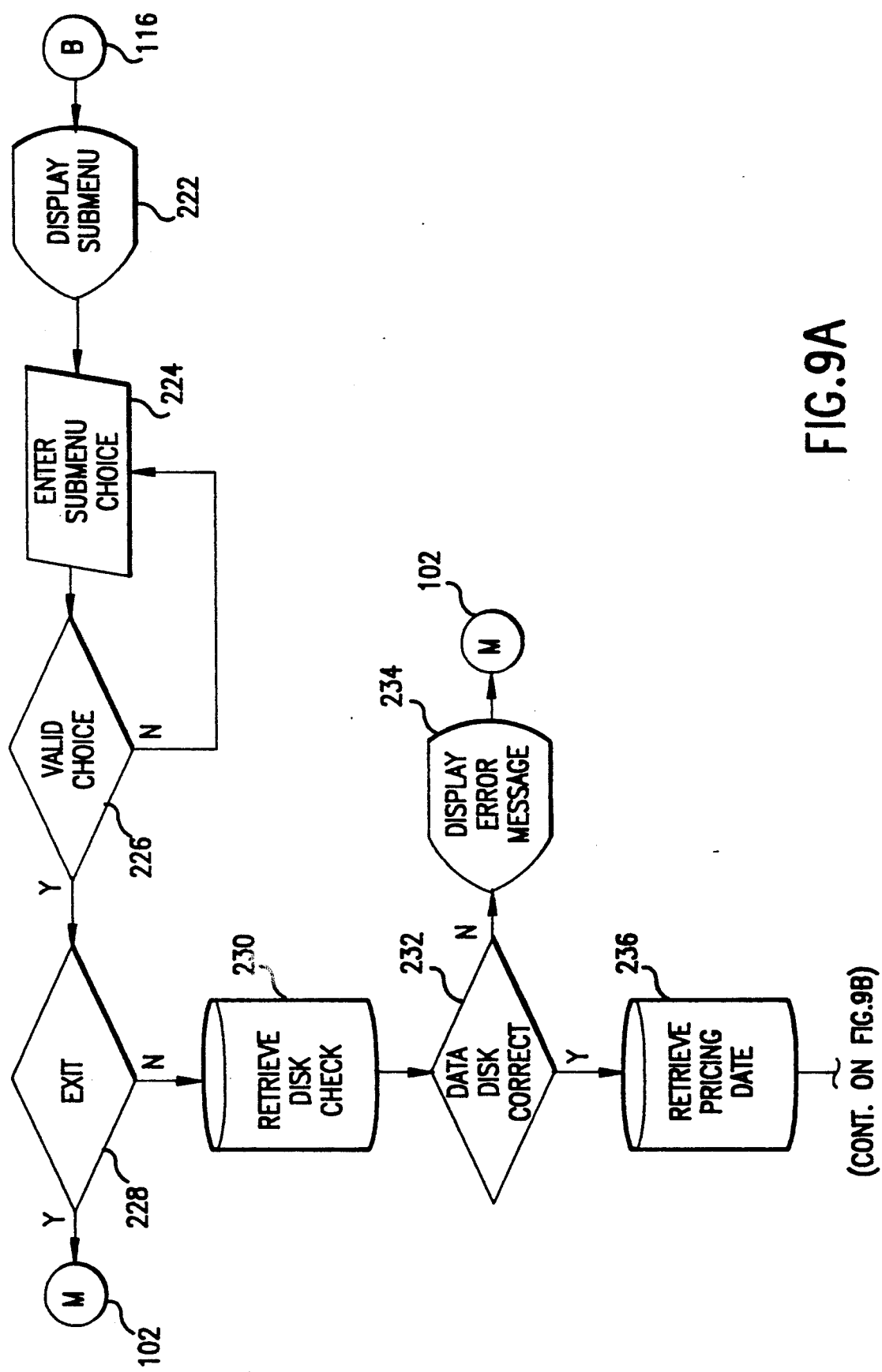
FIGS. 9A-C are a flowchart of a software routine for allocation of daily incremental activity used in a data processing system according to the present invention.
Figure 9B:
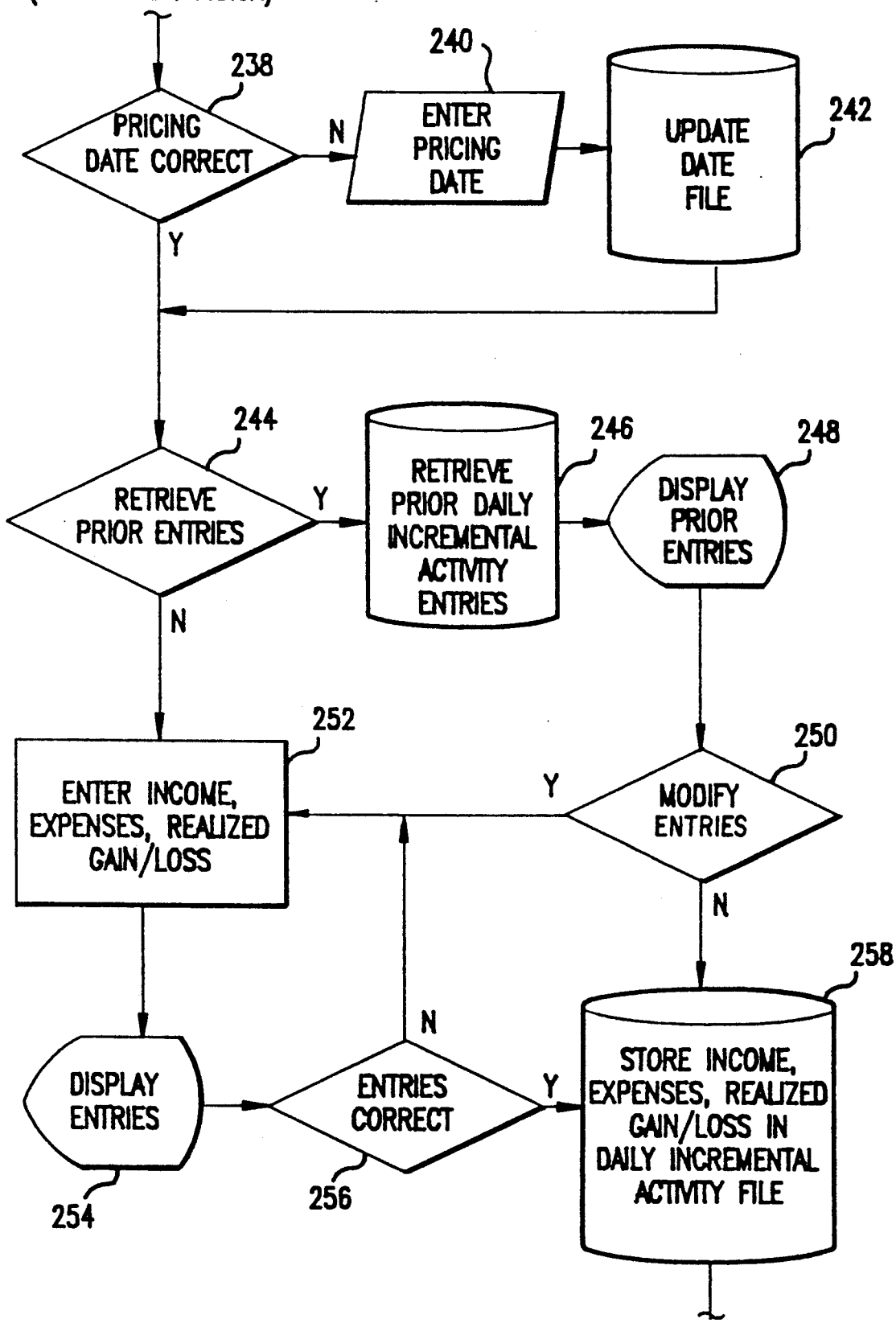
Figure 9C:
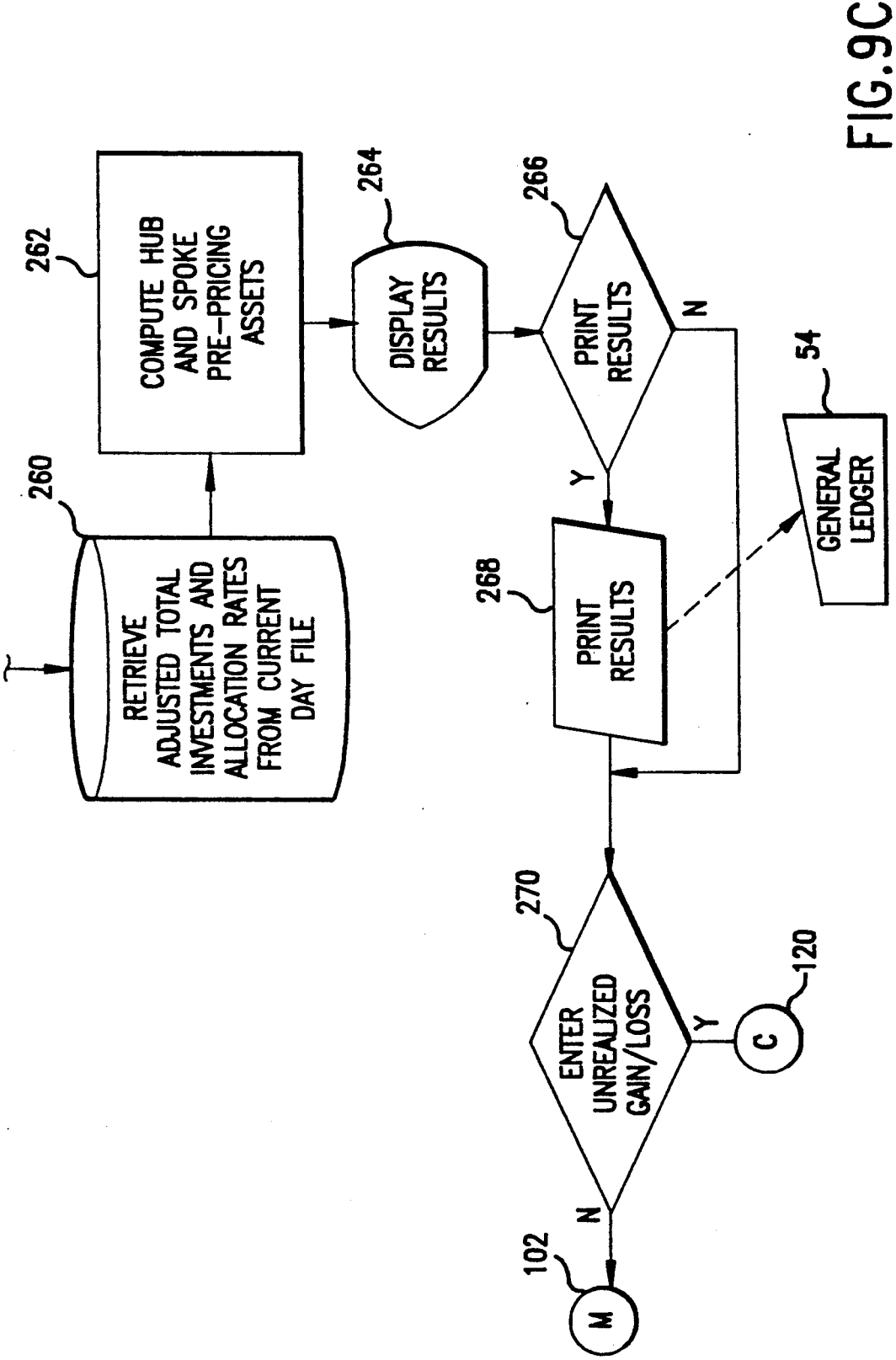

FIGS. 9A–C are a flowchart for a daily incremental activity routine. The purpose of this routine, which implements the modules at blocks 80 and 82 of FIG. 5, is to allocate daily incremental income, expenses, and net realized gain or loss for the portfolio among each of the Spokes. Starting at entry point B, shown in block 116, the system proceeds to block 222, where a submenu is displayed. The system next proceeds to block 224, where the user enters a one-letter submenu choice. At block 226, the system determines whether a valid submenu choice was entered. If not, the system returns to block 224 for the user to enter a submenu choice; if so, the system proceeds to block 228. There the system determines whether the user selected the submenu choice to exit. If so, the system returns to the main menu routine via entry point M, as shown in block 102; if not the system proceeds to the next step.

At block 230, the system retrieves the disk check value from the disk check file. At block 232, the system determines whether the data disk is correct. If not, the system proceeds to block 234, where an error message is displayed, and then returns to the main menu routine via entry point M, at block 102. If the data disk is correct, the system proceeds to block 236.

At block 236, the system retrieves the pricing date from the date file. Next, the system goes to block 238, where the system queries the user to determine whether the pricing date is correct. If so, the system proceeds to block 244; if not, the system goes to block 240 to allow the user to enter the pricing date, then to block 242, in order to update the date file, and then to block 244.

As block 244 shows, the system asks whether the user would like to retrieve prior daily incremental activity entries. It may be, for example, that the user previously ran the daily incremental activity routine to enter the incremental income and expenses, but not the incremental net realized gain or loss. If the user has made no prior entries and thus does not wish to retrieve any data, the system proceeds to block 252. If the user does wish to retrieve data, the system proceeds to block 246, where daily incremental activity entered prior to the current pass through this routine is retrieved from the daily incremental activity file. The system then displays the prior entries, at block 248, and then asks whether the user wishes to modify any of the entries (which would include entering any of them for the first time), as shown at block 250. If not, the system proceeds to block 258; if so, the system goes to block 252.

At block 252, the user may enter data for the daily incremental income, expenses, and net realized gain or loss for the portfolio. (It should be noted here that expenses incurred solely by the funds are accounted for in general ledger 54 or portfolio accounting system 56. These operations are separate from those of software 50 and are not a part of the present invention.) The system then displays the entries, at block 254, and then asks whether the entries are correct, at block 256. If not, the system returns to block 252; if so, the system goes to block 258.

As shown at block 258, the system stores entries for daily incremental income, expense, and net realized gain or loss in the daily incremental activity file. The system then, at block 260, retrieves the adjusted total investments and allocation ratios from the current day file. At block 262, the system then computes the Hub and Spoke prepricing assets, displays the results (at block 264), and asks the user whether to print the results, at block 266. If not, the system goes to block 270; if so, the system prints the results (at block 268) and then goes to block 270. There, the system asks whether the user wishes to enter the unrealized gain or loss. If so, the system proceeds to the unrealized gain or loss routine via entry point C, shown in block 120; if not, the system returns to the main menu routine via entry point M, shown in block 102.

Figure 10A:
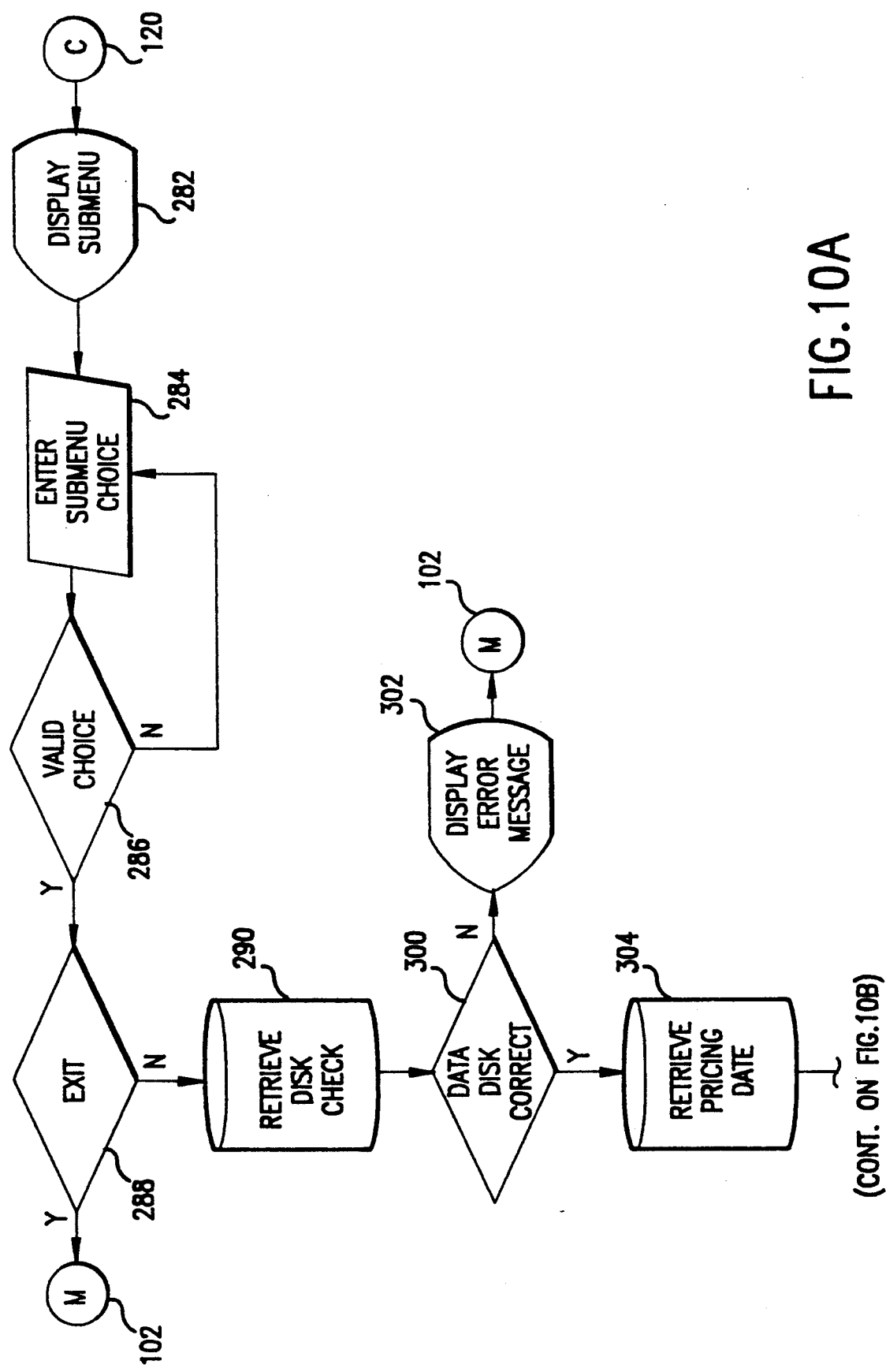
FIGS. 10A-C are a flowchart of a software routine for allocation of daily unrealized gain or loss used in a data processing system according to the present invention.
Figure 10B:
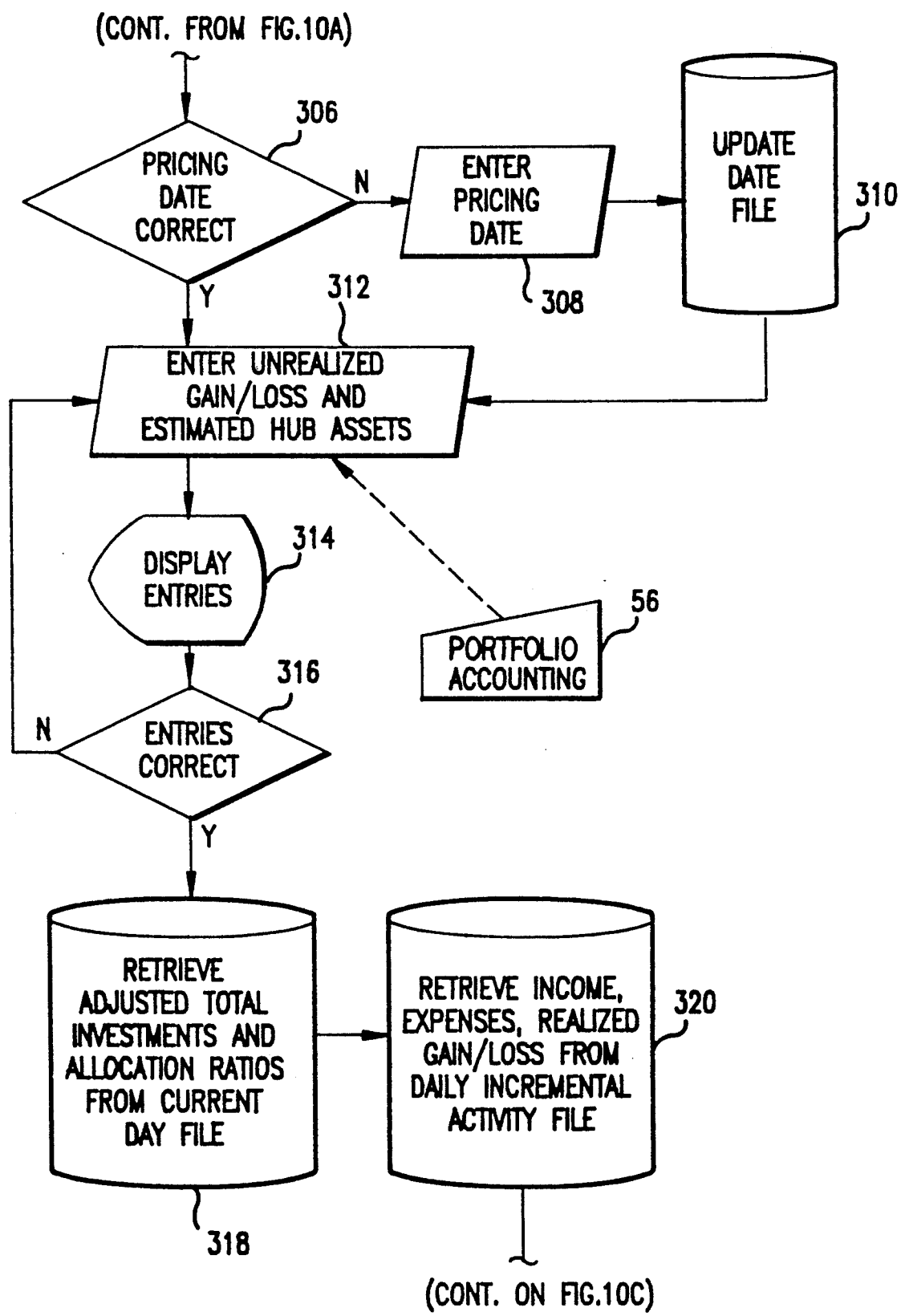
Figure 10C:
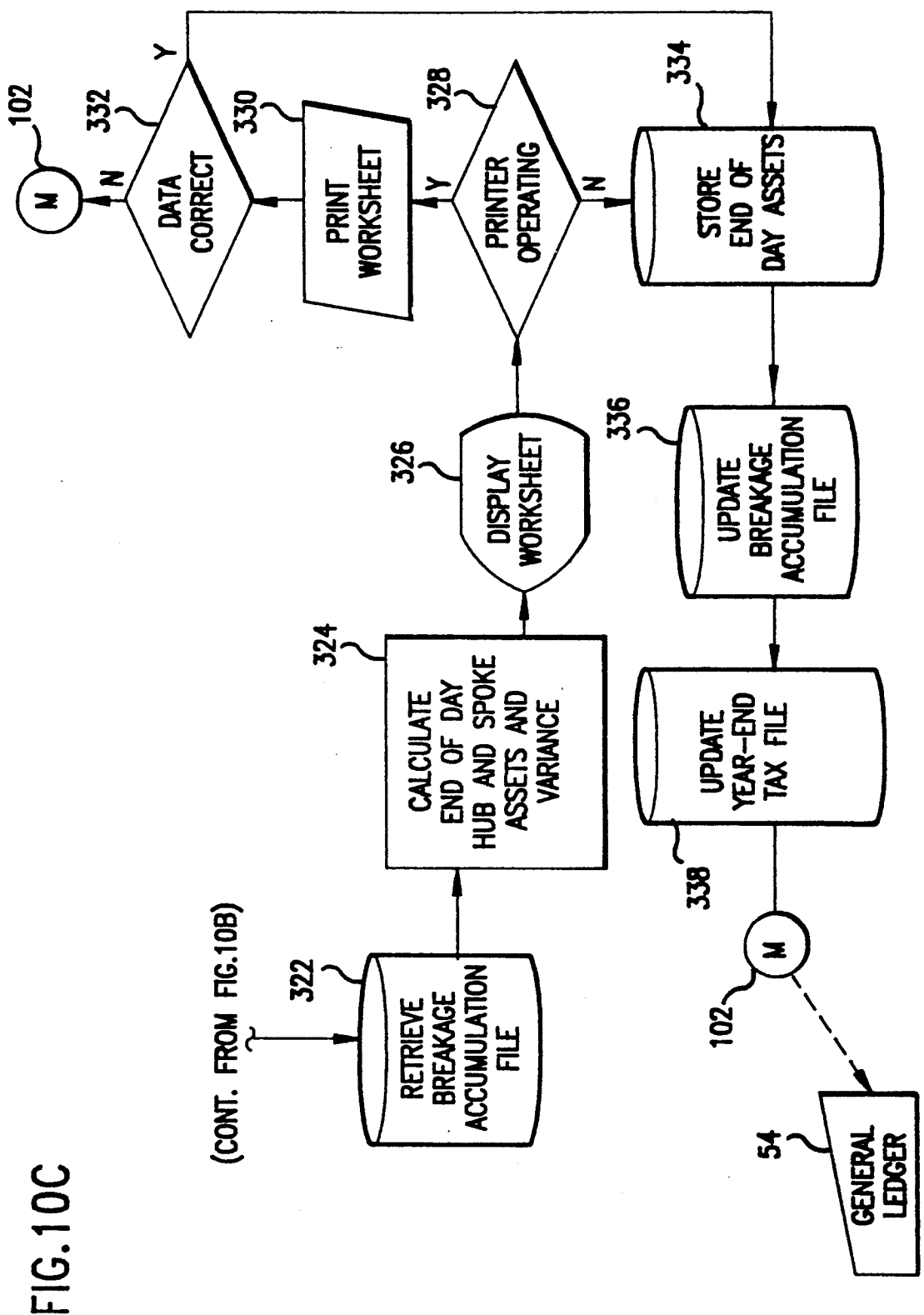

FIGS. 10A-C are a flowchart for a daily unrealized gain or loss routine. The purpose of this routine, which implements the module at block 84 of FIG. 5, is to allocate daily net unrealized gain or loss of the portfolio among each of the funds. Starting at entry point C, shown in block 120, the system proceeds to block 282, where a submenu is displayed. The system next proceeds to block 284, where the user enters a one-letter submenu choice. At block 286, the system determines whether a valid submenu choice was entered. If not, the system returns to block 284 for the user to enter a submenu choice; if so, the system proceeds to block 288. There the system determines whether the user selected the submenu choice to exit. If so, the system returns to the main menu routine via entry point M, as shown in block 102; if not the system proceeds to the next step.

At block 290, the system retrieves the disk check value from the disk check file. At block 300, the system determines whether the data disk is correct. If not, the system proceeds to block 302, where an error message is displayed, and then returns to the main menu routine via entry point M, at block 102. If the data disk is correct, the system proceeds to block 304.

At block 304, the system retrieves the pricing date from the date file. Next, the system goes to block 306, where the system queries the user to determine whether the pricing date is correct. If so, the system proceeds to block 312; if not, the system goes to block 308 to allow the user to enter the pricing date, then to block 310, in order to update the date file, and then to block 312.

As block 312 shows, the system prompts the user to enter the net unrealized gain or loss for the portfolio, and the user's estimate of the end of day Hub assets. This information is typically provided from portfolio accounting system 56 and may be entered into the system manually or automatically as described above for general ledger 54. The user's estimate of the end of day portfolio assets serves as an error checking device. The system next displays the entries, at block 314, and then asks the user, at block 316, whether the entries are correct. If so, the system proceeds to block 318; if not, the system returns to block 312.

At block 318, the system retrieves the adjusted total investments and allocation ratios from the current day file. Next, at block 320, the system retrieves the daily incremental income, expenses, and realized gain or loss from the daily incremental file, and then retrieves the breakage accumulation file, at block 322. The system then goes to block 324, where it calculates the end of day Hub and Spoke assets and the variance with the user's estimate of the Hub assets. The end of day Hub and Spoke assets become the new values for the adjusted total investments for the portfolio and funds. A worksheet containing the results is displayed, at block 326, and the system then determines whether the printer is operating, at block 328. If not, the system proceeds to block 334; if so, the worksheet is printed (block 330) and the user is asked, at block 332, whether the data in the worksheet is correct. If it is not, the system returns to the main menu routine via entry point M, at block 102, so that the user may correct any of the entered data; if the data is correct, the system goes to block 334.

At block 334, the system stores the end of day Hub and Spoke assets by overwriting the prior day's total investments data in the prior day file with the adjusted total investments data in the current day file. At block 336, the system updates the breakage accumulation file with data regarding any fractional discrepancies that may have arisen. Next, at block 338, the system updates the year-end tax file, which involves storing in the tax file the adjusted total investments for the portfolio and each of the funds; the daily incremental income, expenses, and net realized gain or loss for the portfolio; the daily net unrealized gain or loss for the portfolio and funds; and the allocation ratios for each of the funds. The system then returns to the main menu routine via entry point M, as block 102 shows. Data may also be transferred to general ledger 54, either manually or automatically.

Figure 11:
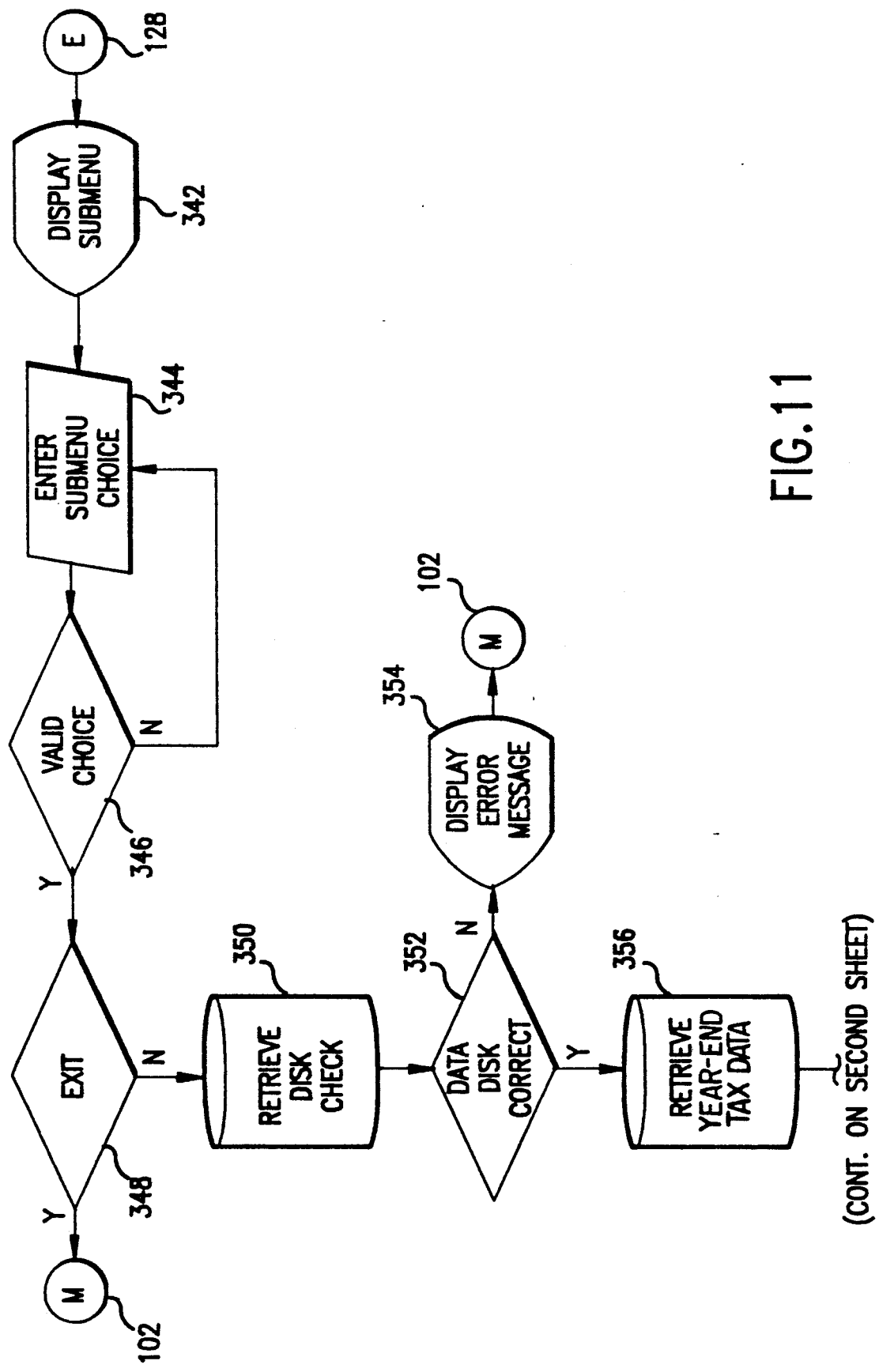
FIG. 11 is a flowchart of a software routine for calculating and processing year-end capital gain and loss data used in a data processing system according to the present invention.
Figure 11:
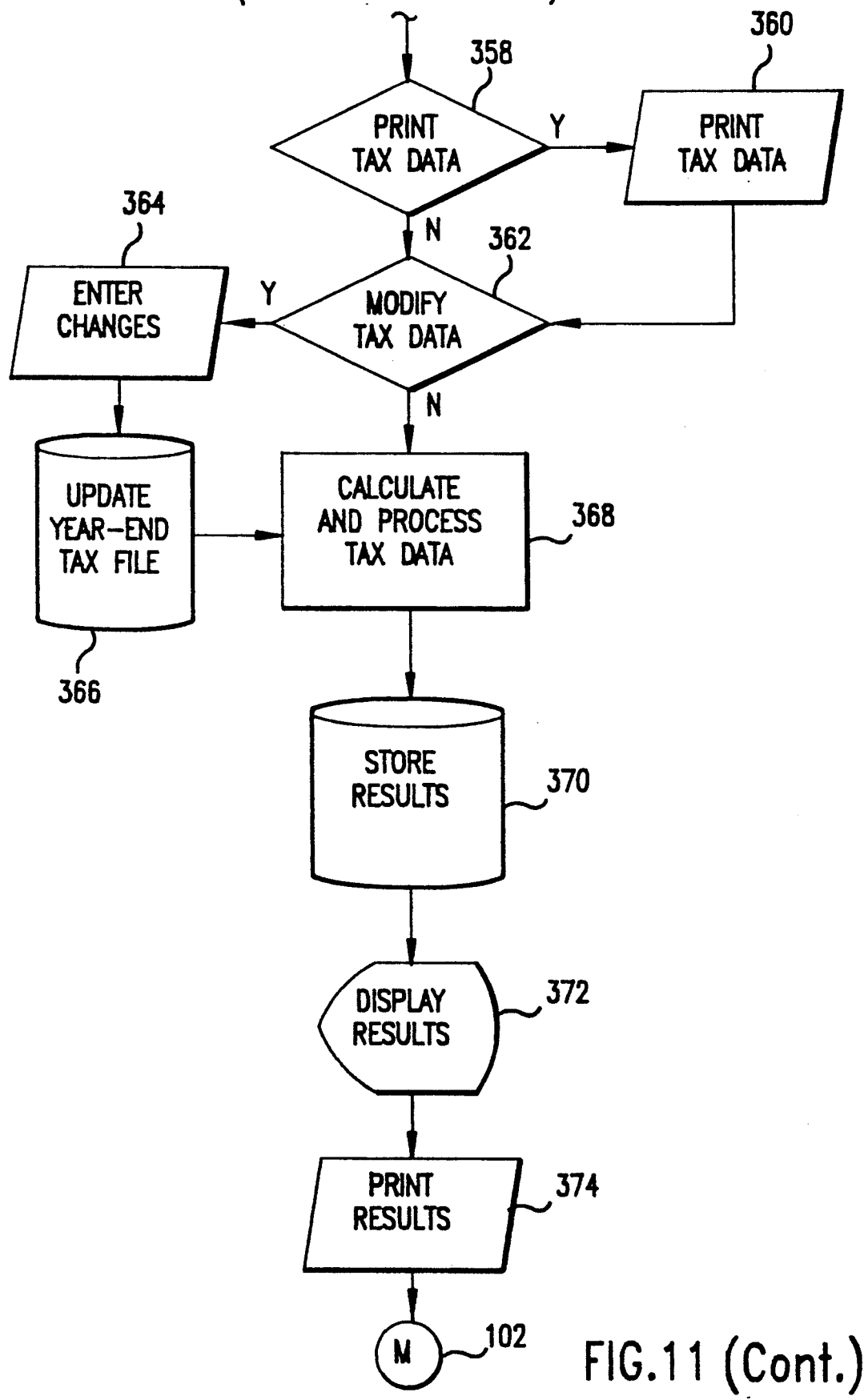

FIG. 11 is a flowchart for a year-end tax routine. The purpose of this routine, which implements module 86 of FIG. 5, is to process and calculate aggregate year-end data for the Hub and its Spokes for tax and accounting purposes. Starting at entry point E, shown in block 128, the system proceeds to block 342, where a submenu is displayed. The system next proceeds to block 344, where the user enters a one-letter submenu choice. At block 346, the system determines whether a valid submenu choice was entered. If not, the system returns to block 344 for the user to enter a submenu choice; if so, the system proceeds to block 348. There the system determines whether the user selected the submenu choice to exit. If so, the system returns to the main menu routine via entry point M, as shown in block 102; if not the system proceeds to the next step.

At block 350, the system retrieves the disk check value from the disk check file. At block 352, the system determines whether the data disk is correct. If not, the system proceeds to block 354, where an error message is displayed, and then returns to the main menu routine via entry point M, at block 102. If the data disk is correct, the system proceeds to block 356.

At block 356, the system retrieves the year-end tax data that the system has been storing in the tax file each day. The system then asks, at block 358, if the user wishes to print the tax data. If not, the system goes to block 362; if so, the system prints the tax data, at block 360, and then proceeds to block 362. There, the system asks whether the user wishes to modify any of the tax data. If not, the system proceeds to block 368; if so, the system goes to block 364, where the user enters changes to the tax data, then to block 366, to update the year-end tax file, and then to block 368.

As block 368 shows, the system calculates and processes the year-end tax data to determine aggregate year-end income, expenses, and capital gain or loss for the Hub and each Spoke. The results are then stored, at block 370, the results are displayed, at block 372, and printed, at block 374. The printout may be in the form of Internal Revenue Service form K-1. The system then returns to the main menu routine, as shown at block 102.

What is claimed is:

1. A data processing system for managing a financial services configuration of a portfolio established as a partnership, each partner being one of a plurality of funds, comprising:
   (a) computer processor means for processing data;
   (b) storage means for storing data on a storage medium;
   (c) first means for initializing the storage medium;
   (d) second means for processing data regarding assets in the portfolio and each of the funds from a previous day and data regarding increases or decreases in each of the funds, assets and for allocating the percentage share that each fund holds in the portfolio;
   (e) third means for processing data regarding daily incremental income, expenses, and net realized gain or loss for the portfolio and for allocating such data among each fund;
   (f) fourth means for processing data regarding daily net unrealized gain or loss for the portfolio and for allocating such data among each fund; and
   (g) fifth means for processing data regarding aggregate year-end income, expenses, and capital gain or loss for the portfolio and each of the funds.

2. A data processing system as claimed in claim 1, wherein said first means further comprises:
   (a) means for inputting and storing on the storage medium pricing date data;
   (b) means for inputting and storing on the storage medium data regarding assets of each fund;
   (c) means for storing on the storage medium a value identifying the storage medium; and
   (d) means for creating locations on the storage medium for storing data regarding:
       (i) a previous day's total investments for the portfolio and each of the funds;
       (ii) adjusted total investments for the portfolio and each of the funds;
       (iii) allocation ratios indicative of the percentage share that each fund holds in the portfolio;
       (iv) daily incremental income, expenses, and realized gain or loss for the portfolio;
       (v) all daily activity for the portfolio and each of the funds; and
       (vi) breakage accumulation.

3. A data processing system as claimed in claim 2, wherein said second means further comprises:
   (a) means for verifying that the storage medium is correct by retrieving from the storage medium the value identifying the storage medium;
   (b) means for retrieving from the storage medium the pricing date data and allowing the pricing date data to be corrected if necessary;
   (c) means for inputting and storing on the storage medium the data regarding increases or decreases in each of the funds' assets;
   (d) means for retrieving from the storage medium the data regarding a previous day's total investments; and
   (e) means for calculating and storing on the storage medium the data regarding adjusted total investments and allocation ratios.

4. A method as claimed in claim 3, wherein said third means further comprises:
   (a) means for verifying that the storage medium is correct by retrieving from the storage medium the value identifying the storage medium;
   (b) means for retrieving from the storage medium the pricing date data and for allowing the pricing date data to be corrected if necessary;
   (c) means for allowing retrieval from the storage medium of any previously input data regarding daily incremental income, expenses, and net realized gain or loss;
   (d) means for inputting and for storing on the storage medium the data regarding daily incremental income, expenses, and net realized gain or loss;
   (e) means for retrieving from the storage medium the data regarding adjusted total investments and allocation ratios; and
   (f) means for computing data representing prepricing assets for the portfolio and each of the funds.

5. A data processing system as claimed in claim 4, wherein said fourth means further comprises:
   (a) means for verifying that the storage medium is correct by retrieving from the storage medium the value identifying the storage medium;
   (b) means for retrieving from the storage medium the pricing date data and allowing the pricing date data to be corrected if necessary;
   (c) means for inputting data representing net unrealized gain or loss for the portfolio;
   (d) means for retrieving from the storage medium the data regarding adjusted total investments and allocation ratios;
   (e) means for retrieving from the storage medium the data regarding daily incremental income, expenses, and net realized gain or loss;
   (f) means for retrieving from the storage medium the data representing breakage accumulation;
   (g) means for calculating and for storing on the storage medium data regarding end of day assets for the portfolio and each of the funds;
   (h) means for storing on the storage medium updated data regarding breakage accumulation; and
   (i) means for storing on the storage medium data regarding all daily activity for the portfolio and each of the funds.

6. A data processing system as claimed in claim 5, wherein said fifth means further comprises:
   (a) means for verifying that the storage medium is correct by retrieving from the storage medium the value identifying the storage medium;

(b) means for retrieving from the storage medium the data regarding all daily activity for the portfolio and each of the funds;
(c) means for calculating and processing the data regarding all daily activity to obtain data regarding aggregate year-end income, expenses, and capital gain or loss for the portfolio and each of the funds; and
(d) means for storing on the storage medium the data regarding aggregate year-end income, expenses, and capital gain or loss.

* * * * *